United States Patent
Tsunekawa

(10) Patent No.: US 9,720,281 B2
(45) Date of Patent: Aug. 1, 2017

(54) OPTICAL LAMINATE FOR FRONT SURFACE OF IN-CELL TOUCH PANEL LIQUID CRYSTAL ELEMENT AND IN-CELL TOUCH PANEL LIQUID CRYSTAL DISPLAY DEVICE USING SAME

(71) Applicant: DAI NIPPON PRINTING CO., LTD., Tokyo (JP)

(72) Inventor: Masayuki Tsunekawa, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 130 days.

(21) Appl. No.: 14/438,832

(22) PCT Filed: Oct. 25, 2013

(86) PCT No.: PCT/JP2013/079038
§ 371 (c)(1),
(2) Date: Apr. 27, 2015

(87) PCT Pub. No.: WO2014/069377
PCT Pub. Date: May 8, 2014

(65) Prior Publication Data
US 2015/0293390 A1   Oct. 15, 2015

(30) Foreign Application Priority Data

Oct. 29, 2012  (JP) .................................. 2012-238256
Apr. 24, 2013  (JP) .................................. 2013-091070

(51) Int. Cl.
*G02F 1/13363*  (2006.01)
*B32B 7/02*     (2006.01)
(Continued)

(52) U.S. Cl.
CPC ............ *G02F 1/13363* (2013.01); *B32B 7/02* (2013.01); *G02B 1/08* (2013.01); *G02B 5/305* (2013.01);
(Continued)

(58) Field of Classification Search
None
See application file for complete search history.

(56) References Cited

U.S. PATENT DOCUMENTS 7,190,354 B2 *  3/2007  Tanaka ................ G02F 1/13338
                                                              345/173
7,268,770 B1    9/2007  Takahata et al.
(Continued)

FOREIGN PATENT DOCUMENTS

| CN | 1601335  | 3/2005 |
|---|---|---|
| CN | 100507644 | 7/2009 |

(Continued)

OTHER PUBLICATIONS

Office Action issued for Taiwanese patent application No. 102139055, dated Aug. 22, 2016, 9 pages.

(Continued)

*Primary Examiner* — Anthony J Frost
(74) *Attorney, Agent, or Firm* — Hamre, Schumann, Mueller & Larson, P.C.

(57) ABSTRACT

An optical laminate for a front surface of an in-cell touch panel liquid crystal element has reduced thickness while avoiding cloudiness of the liquid crystal screen. The optical laminate for a front surface of an in-cell touch panel liquid crystal element comprises a phase difference plate, a polarizing film, and a transparent substrate in this order, and further comprises a conductive layer. The transparent substrate has optical anisotropy that scatters linear polarized light emitted from the polarizing film, the phase difference (Continued)

plate, the polarizing film, and the transparent substrate are laminated without other layers or only through the conductive layer, and a thickness of the optical laminate is in a range of 32 μm to 300 μm.

20 Claims, 3 Drawing Sheets

(51) Int. Cl.
    *G02F 1/1333* (2006.01)
    *G02F 1/1335* (2006.01)
    *G02B 5/30* (2006.01)
    *G02B 1/08* (2006.01)

(52) U.S. Cl.
    CPC ......... *G02B 5/3025* (2013.01); *G02B 5/3083* (2013.01); *G02F 1/13338* (2013.01); *G02F 1/133528* (2013.01); *B32B 2457/202* (2013.01); *G02F 2001/133638* (2013.01)

(56) References Cited

U.S. PATENT DOCUMENTS

| | | | |
|---|---|---|---|
| 7,833,607 B2* | 11/2010 | Kawano | G02B 1/105 359/585 |
| 2004/0017364 A1 | 1/2004 | Tanaka et al. | |
| 2005/0237440 A1 | 10/2005 | Sugimura et al. | |
| 2007/0091218 A1* | 4/2007 | Huang | G02F 1/136204 349/40 |
| 2007/0247710 A1* | 10/2007 | Nakashima | G02B 5/3025 359/487.05 |
| 2007/0285603 A1* | 12/2007 | Nakayama | C08J 5/18 349/118 |
| 2010/0182524 A1* | 7/2010 | Nomura | G02F 1/133308 349/40 |
| 2011/0012845 A1* | 1/2011 | Rothkopf | G06F 3/044 345/173 |
| 2011/0242027 A1* | 10/2011 | Chang | G06F 3/0412 345/173 |
| 2012/0229423 A1 | 9/2012 | Takamiya et al. | |

FOREIGN PATENT DOCUMENTS

| | | |
|---|---|---|
| JP | 1170629 | 3/1999 |
| JP | 2001311949 | 11/2001 |
| JP | 2004020701 | 1/2004 |
| JP | 2004-227010 | 8/2004 |
| JP | 2009-053371 | 3/2009 |
| JP | 2011-76602 | 4/2011 |
| JP | 2011-133881 | 7/2011 |
| JP | 2011-222009 | 11/2011 |

OTHER PUBLICATIONS

Office Action issued for Chinese patent application No. 201380054924.3, dated Aug. 3, 2016, 9 pages.
International Search Report, Jan. 21, 2014; PCT/JP2013/079038.

* cited by examiner

OPTICAL LAMINATE FOR FRONT SURFACE OF IN-CELL TOUCH PANEL LIQUID CRYSTAL ELEMENT AND IN-CELL TOUCH PANEL LIQUID CRYSTAL DISPLAY DEVICE USING SAME

TECHNICAL FIELD

The present invention relates to an optical laminate for a front surface of an in-cell touch panel liquid crystal element and an in-cell touch panel liquid crystal display device using the same.

BACKGROUND ART

In recent years, portable liquid crystal terminals represented by smartphones and other liquid crystal display devices have been equipped with a touch panel function. In the related art, the above-described liquid crystal display device equipped with a touch panel function was mainly an external liquid crystal display device including a touch panel attached onto the liquid crystal display device.

Since the external liquid crystal display device is produced by separately manufacturing a liquid crystal display device and a touch panel, and then integrating them together, even when any one of the components does not work properly, the other component can still be used, and thus the yield is excellent, but there has been a problem in that the thickness or weight increases.

To solve the above-described problem (with the thickness or weight) of the external liquid crystal display device, a so-called on-cell liquid crystal display device produced by incorporating a touch panel between a liquid crystal element and a polarization plate in the liquid crystal display device has emerged.

In addition, more recently, as a liquid crystal display device having a smaller thickness or weight than the on-cell liquid crystal display device, a so-called in-cell liquid crystal display device produced by incorporating a touch function into a liquid crystal element has begun to be developed (PTLs 1 and 2).

CITATION LIST

Patent Literature

[PTL 1] Japanese Unexamined Patent Application Publication No. 2011-76602
[PTL 2] Japanese Unexamined Patent Application Publication No. 2011-222009

SUMMARY OF INVENTION

Technical Problem

The in-cell liquid crystal display device has a constitution in which an optical laminate to which films and the like having a variety of functions are attached through an adhesion layer is installed on a liquid crystal element equipped with a touch function. Examples of the films and the like having a variety of functions include a phase difference plate, a polarizing film, a protective film for the polarizing film, a cover glass, and the like.

In addition, to improve the visibility through polarized sunglasses, there is a case in which a so-called 1/4 wavelength phase difference plate is attached onto the cover glass. As described above, the optical laminate on the in-cell touch panel liquid crystal element is constituted of a phase difference plate, a polarizing film, a protective film for the polarizing film, a cover glass, a 1/4 wavelength phase difference plate, and the like, and these components are attached to the liquid crystal element through an adhesion layer.

In the in-cell liquid crystal display device, there have been studies to sufficiently reduce the thickness of, in the entire constitution, the liquid crystal element section equipped with a touch function. However, there have been no studies to sufficiently reduce the thickness of the optical laminate installed on the liquid crystal element. In addition, as a problem not related to thickness reduction, the in-cell liquid crystal display device has another problem in that a liquid crystal screen becomes partially cloudy when touched with a finger.

The present invention has been made in consideration of the above-described circumstances, and an object of the present invention is to provide an optical laminate for a front surface of an in-cell touch panel liquid crystal element in which the thickness can be reduced while necessary functions are ensured, and a liquid crystal screen becoming cloudy can be prevented.

Means of Solving the Problem

As a result of repetitive intensive studies to achieve the above-described object, the present inventors found that, in an external or on-cell liquid crystal display device of the related art, a touch panel located on an operator side of a liquid crystal element serves as a conductive member; however, in an in-cell liquid crystal display device, the conductive member does not need to be present on the operator side of the liquid crystal element, which causes a screen to become cloudy.

In addition, the present inventors studied the constitution of an optimal layer to prevent a liquid crystal screen from becoming cloudy, and sufficiently reduce the thickness while necessary functions are ensured, and achieved the above-described object.

That is, according to the present invention, there is provided an optical laminate for a front surface of an in-cell touch panel liquid crystal element including a phase difference plate, a polarizing film, and a transparent substrate in this order, and further including a conductive layer, in which the transparent substrate has optical anisotropy that scatters linear polarized light emitted from the polarizing film, the phase difference plate, the polarizing film, and the transparent substrate are laminated without other layers or only through the conductive layer, and a thickness of the optical laminate is in a range of 32 μm to 200 μm.

Hereinafter, in some cases, the transparent substrate having optical anisotropy that scatters linear polarized light emitted from the polarizing film will be referred to as "optical anisotropic substrate".

In addition, the in-cell touch panel liquid crystal display device of the present invention is produced by attaching a surface of the optical laminate of the present invention, which is present on the opposite side to the transparent substrate on the basis of the polarizing film, onto the in-cell touch panel liquid crystal element.

The optical laminate of the present invention may include an adhesion layer to laminate a cover glass and a cover glass on the optical anisotropic substrate, and the thickness of the optical laminate mentioned in the present invention refers to the thickness of the optical laminate from which the cover glasses and the adhesion layer for laminating the cover glasses are removed.

In addition, the "being laminated without other layers" in the present invention does not mean that the inclusion of other layers is fully excluded. For example, it does not mean that even an extremely thin layer such as an easy adhesion layer previously provided on the substrate is excluded. More specifically, the "being laminated without other layers" in the present invention does not mean that a constitution in which the phase difference plate, the polarizing film, and the optical anisotropic substrate are laminated through another thin layer having a thickness of less than 0.5 μm is excluded.

Advantageous Effects of Invention

The optical laminate for a front surface of an in-cell touch panel liquid crystal element of the present invention is capable of reducing the thickness while necessary functions are ensured, and preventing a liquid crystal screen from becoming cloudy.

DESCRIPTION OF EMBODIMENTS

[Optical Laminate]

Figure 1:
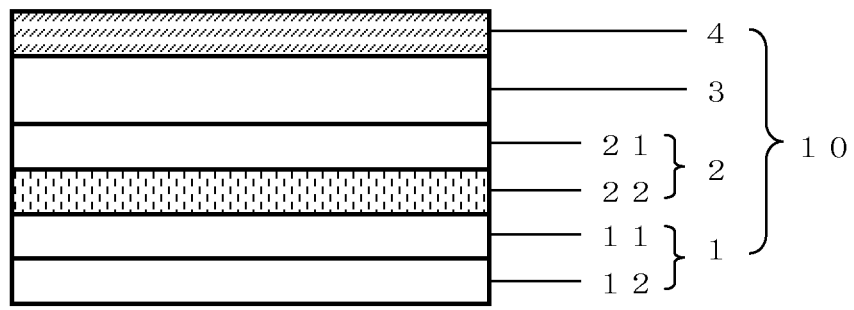
FIG. 1 is a cross-sectional view illustrating an embodiment of an optical laminate for a front surface of an in-cell touch panel liquid crystal element of the present invention.

An optical laminate for a front surface of an in-cell touch panel liquid crystal element of the present invention includes a phase difference plate, a polarizing film, and a transparent substrate in this order, and further includes a conductive layer. The transparent substrate has optical anisotropy that scatters linear polarized light emitted from the polarizing film, the phase difference plate, the polarizing film, and the transparent substrate are laminated without other layers or only through the conductive layer, and a thickness of the optical laminate is in a range of 32 μm to 200 μm. Hereinafter, embodiments of the present invention will be described.

<Phase Difference Plate>

The phase difference plate is constituted to include at least a phase difference layer. Examples of the phase difference layer include stretched films such as a stretched polycarbonate film, a stretched polyester film, and a stretched cyclic olefin film, and layers including an anisotropic refractive index material. From the viewpoint of the control of retardation, between the stretched films and the layers, the layers are preferred.

The layer including an anisotropic refractive index material (hereinafter, also referred to as "anisotropic material-containing layer") may singly constitute the phase difference plate, or may be placed on a resin film to constitute the phase difference plate.

Examples of a resin constituting the resin film include polyester-based resins, polyolefin-based resins, (meth)acryl-based resins, polyurethane-based resins, polyethersulfone-based resins, polycarbonate-based resins, polysulfone-based resins, polyether-based resins, polyether ketone-based resins, (meth)aceronitrile-based resins, cycloolefin-based resin, and the like, and one or more of the above-described resins can be used. Among them, from the viewpoint of dimensional stability and optical stability, cycloolefin-based resins are preferred.

Examples of the anisotropic refractive index material include rod-shaped compounds, disk-shaped compounds, liquid crystal molecules, and the like.

In a case in which the anisotropic refractive index material is used, it is possible to produce a variety of types of phase difference plates depending on the orientation direction of the anisotropic refractive index material.

Examples of the phase difference plate include a so-called positive C plate in which the optical axis of the anisotropic refractive index material is in the normal direction of the anisotropic material-containing layer and which has an extraordinary beam refractive index greater than the ordinary beam refractive index in the normal direction of the anisotropic material-containing layer.

Examples of the phase difference plate also include a so-called positive A plate in which the optical axis of the anisotropic refractive index material is in parallel with the anisotropic material-containing layer and which has an extraordinary beam refractive index greater than the ordinary beam refractive index in the in-plane direction of the anisotropic material-containing layer.

Examples of the phase difference plate also include a so-called negative C plate in which the optical axis of the liquid crystal molecule is in parallel with the anisotropic material-containing layer and a cholesteric orientation having a spiral structure in the normal direction is formed, whereby the entire anisotropic material-containing layer has an extraordinary beam refractive index smaller than the ordinary beam refractive index in the normal direction of the phase difference layer.

Furthermore, as the phase difference plate, it is also possible to produce a negative A plate in which a discotic liquid crystal having a negative birefringence anisotropy has the optical axis in the in-plane direction of the anisotropic material-containing layer.

In addition, the anisotropic material-containing layer may be inclined with respect to the layer, or may be a hybrid orientation plate in which the inclination angle changes in a direction perpendicular to the layer.

A variety of types of the phase difference layers described above can be manufactured using the method described in, for example, Japanese Patent Application Publication No. 2009-053371.

The phase difference plate may be constituted of any one plate of the above-described positive or negative C plate, A plate, and hybrid orientation plate, or may be constituted of two or more plates obtained by combining one or more plates described above. For example, in the case of a VA mode in-cell touch panel liquid crystal element, it is preferable to use a combination of the positive A plate and the negative C plate, and in the case of a IPS mode in-cell touch panel liquid crystal element, it is preferable to use a combination of the positive C plate and the positive A plate or a biaxial plate, but any combination may be used as long as the viewing angle can be compensated. A variety of combinations can be considered, and it is possible to select an appropriate combination.

In a case in which the phase difference plate is constituted of two or more plates, from the viewpoint of thickness reduction, a phase difference plate in which the stretched film is used as a first plate and the anisotropic material-containing layer (a second plate) is laminated on the stretched film is preferred.

Figure 2:
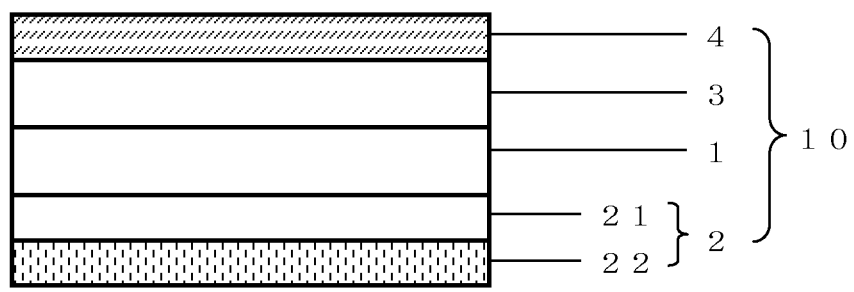
FIG. 2 is a cross-sectional view illustrating another embodiment of the optical laminate for a front surface of an in-cell touch panel liquid crystal element of the present invention.
Figure 3:
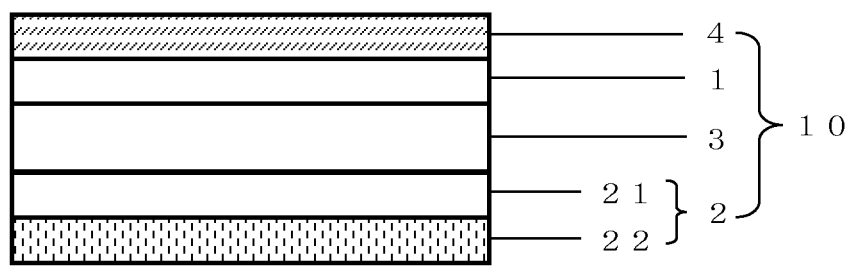
FIG. 3 is a cross-sectional view illustrating still another embodiment of the optical laminate for a front surface of an in-cell touch panel liquid crystal element of the present invention.

A phase difference plate 2 is located on the opposite side to an optical anisotropic substrate 4 on the basis of a polarizing film 3 in an optical laminate (FIGS. 1 to 3). In addition, in a case in which the phase difference plate 2 includes an anisotropic material-containing layer 22 on a resin film (a resin film having a phase difference or an ordinary resin film) 21, the phase difference plate is preferably disposed so that the resin film 21 faces a polarizing film 3 side. When the resin film is disposed in the above-described side, it is possible to make the resin film 21 in the phase difference plate 2 to function as a protective film for the polarizing film 3, and to reduce the thickness of the optical laminate 10.

The thickness of the phase difference plate is preferably in a range of 25 μm to 60 μm, and more preferably in a range of 25 μm to 30 μm. In a case in which the phase difference plate is constituted of two or more plates, when the stretched film is used as a first plate, and the anisotropic material-containing layer (a second plate) is laminated on the stretched film, it is possible to facilitate the setting of the thickness within the above-described range.

<Polarizing Film>

The polarizing film is located between the phase difference plate and a surface protection film.

The polarizing film may be any polarizing film as long as the polarizing film has a function of transmitting only light having a specific vibration direction, and examples thereof include PVA-based polarizing films obtained by stretching a PVA-based film or the like, and dyeing the film using iodine, a dichromatic dye, or the like, polyene-based polarizing films such as dehydrated PVA or dehydrochlorinated polyvinyl chloride, reflective polarizing films for which a cholesteric liquid crystal is used, thin film crystal film-based polarizing films, and the like. Among them, PVA-based polarizing films which develop adhesiveness using water and are capable of adhering the phase difference plate or the surface protective film without providing an adhesion layer are preferred.

Examples of the PVA-based polarizing film include polarizing films obtained by adsorbing a dichromatic substance such as iodine or a dichromatic dye to a hydrophilic macromolecular film such as a PVA-based film, a partially formalized polyvinyl alcohol-based film, or an ethylene-vinyl acetate copolymer-based partially saponified film, and uniaxially stretching the film. Among them, from the viewpoint of adhesiveness, a polarizing film constituted of a PVA-based film and a dichromatic substance such as iodine is preferably used.

A PVA-based resin constituting the PVA-based film is obtained by saponifying polyvinyl acetate.

The thickness of the polarizing film is preferably in a range of 2 μm to 30 μm, and more preferably in a range of 3 μm to 30 μm.

<Transparent Substrate>

The transparent substrate has optical anisotropy that scatters linear polarized light emitted from the polarizing film. The transparent substrate (optical anisotropic substrate) having the above-described function plays a role of protecting the polarizing film, and is capable of improving the visibility through polarized sunglasses. The "improving the visibility through polarized sunglasses" means that, when the optical laminate is disposed on the front surface of the liquid crystal display element, there are no unevenness with different colors (hereinafter, also referred to as "rainbow interference pattern") observed on a display screen. The rainbow interference pattern becomes particularly apparent when the display screen is observed at an inclined angle, and can be prevented using an optical anisotropic surface protective film. In addition, when the optical anisotropic surface protective film is used, it is possible to prevent the display screen from becoming invisible using the angle between linear polarized light and polarized sunglasses.

Figure 4:
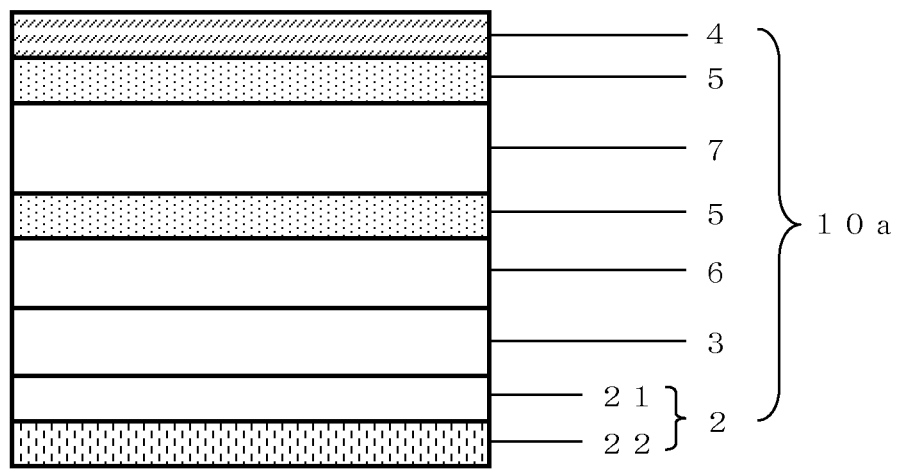
FIG. 4 is a cross-sectional view illustrating an example of an optical laminate for a front surface of an in-cell touch panel liquid crystal element of the related art.
Figure 5:
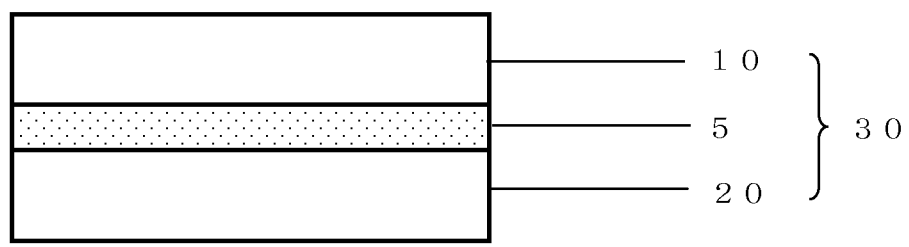
FIG. 5 is a cross-sectional view illustrating an example of an in-cell touch panel liquid crystal display device of the present invention.

In the optical laminate of the related art, as illustrated in FIG. 4, a triacetyl cellulose (TAC) film 7 is used only to protect the polarizing film, and the optical anisotropic substrate is grounded on the cover glass to prevent the rainbow interference pattern.

The optical anisotropic substrate in the present invention plays a role of protecting the polarizing film, and is capable of preventing the rainbow interference pattern when the display screen is observed through polarized sunglasses, and therefore it is possible to reduce the thickness compared with the constitution of the related art.

Examples of the optical anisotropic substrate include plastic films having a retardation value in a range of 3000 nm to 30000 nm, plastic films having a 1/4 wavelength phase difference, and the like.

When the retardation value is set to 3000 nm or more, the plastic films having a retardation value in a range of 3000 nm to 30000 nm (hereinafter, in some cases, referred to as "high retardation film") prevents the occurrence of the rainbow interference pattern on the display screen of the liquid crystal display device when the liquid crystal display device is observed through polarized sunglasses. In addition, the retardation value is preferably 3000 nm or more since the interference unevenness (interference unevenness generated by the interference between light reflected from the surface of the optical anisotropic film and light that has passed through the optical anisotropic film and is reflected from the surface of a cured layer) of reflected light caused by the optical anisotropic substrate can be prevented. Even when the retardation value is excessively increased, the enhancement of a rainbow interference pattern-improving effect disappears, and therefore the film thickness becoming thicker than necessary is prevented by setting the retardation value to 30000 nm or less.

The retardation value of the high retardation film is preferably in a range of 6000 nm to 30000 nm.

Meanwhile, the above-described retardation value is preferably satisfied at wavelengths around a wavelength of 589.3 nm.

The retardation value (nm) is expressed by the following equation using the refractive index (nx) in a direction in which the refractive index is greatest (slow axis direction) in the plane of the plastic film, the refractive index (ny) in a direction orthogonal to the slow axis direction (fast axis direction), and the thickness (d) (nm) of the plastic film.

$$\text{Retardation value (Re)} = (nx - ny) \times d$$

In addition, the retardation value can be measured (with a measurement angle of 0° and a measurement wavelength of 589.3 nm) using, for example, KOBRA-WR manufactured by Oji Scientific Instruments.

Alternatively, the retardation value can be obtained as described below. The orientation axis direction (the direction of the main axis) of the substrate is obtained using two polarization plates, the refractive indexes (nx and ny) of two axes orthogonal to the orientation axis direction are obtained using an Abbe refractometer (manufactured by Atago Co., Ltd., NAR-AT), and an axis exhibiting a great refractive index is defined as the slow axis. The refractive index difference (nx-ny) obtained in the above-described manner is multiplied by the thickness measured using an electric micrometer (manufactured by Anritsu), thereby obtaining the retardation value.

In the present invention, the nx-ny (hereinafter, in some cases, referred to as "Δn") is preferably in a range of 0.05 or more, and more preferably 0.07 or more from the viewpoint of the suppression of the rainbow interference pattern and the suppression of the film thickness.

As a material constituting the high retardation film, a material selected from a group consisting of polyester-based resins, polyolefin-based resins, (meth)acryl-based resins, polyurethane-based resins, polyether sulfone-based resins, polycarbonate-based resins, polysulfone-based resins, polyether-based resins, polyether ketone-based resins, (meth)acrylonitrile-based resins, and cycloolefin-based resins is preferably used. Among them, polyester-based resins are preferred, and among polyester-based resins, polyethylene terephthalate (PET) or polyethylene naphthalate (PEN) is more preferred.

In a case in which the high retardation film is made of polyester such as the above-described PET, the high retardation film can be obtained by melting the material of polyester, horizontally stretching unstretched polyester that has been extruded and molded into a sheet shape at a temperature of the glass transition temperature or higher using a tenter or the like, and then carrying out a thermal treatment. The horizontal stretching temperature is preferably in a range of 80° C. to 130° C., and more preferably in a range of 90° C. to 120° C. In addition, the horizontal stretch ratio is preferably in a range of 2.5 times to 6.0 times, and more preferably in a range of 3.0 times to 5.5 times. When the stretch ratio is set to 2.5 times or more, the stretching tension can be increased, the birefringence of the obtained film becomes great, and it is possible to set the retardation value to 3000 nm or more. In addition, when the horizontal stretch ratio is set to 6.0 times or less, it is possible to prevent the degradation of the transparency of the film.

Examples of a method for controlling the retardation value of the high retardation film produced using the above-described method to 3000 nm or more include a method in which the stretch ratio, the stretching temperature, and the film thickness of the high retardation film to be produced are appropriately set. Specifically, for example, as the stretch ratio increases, and as the stretching temperature decreases, in addition, as the film thickness increases, it becomes easier to obtain a high retardation value.

In a case in which the high retardation film is used, from the viewpoint of preventing the rainbow interference pattern, the angle formed by the absorption axis of the polarizing film and the slow axis of the high retardation film in the optical laminate is preferably set in a range of 5 degrees to 85 degrees, more preferably set in a range of 10 degrees to 80 degrees, still more preferably set in a range of 30 degrees to 60 degrees, and most preferably 45 degrees. The slow axis direction of the high retardation film is a direction of the average orientation angle of the slow axis directions obtained using a molecular orientation analyzer (MOA) manufactured by Oji Scientific instruments.

As the plastic film having a 1/4 wavelength phase difference, a proper 1/4 wavelength phase difference film having a phase difference at 550 nm of 137.5 nm can be used, and it is also possible to use a substantially 1/4 wavelength phase difference film having a phase difference at 550 nm in a range of 80 nm to 170 nm. The proper 1/4 wavelength phase difference film and substantially 1/4 wavelength phase difference film are preferred since it is possible to prevent the occurrence of the rainbow interference pattern on the display screen of the liquid crystal display device when the display screen is observed using polarized sunglasses, and it is possible to reduce the film thickness compared with a high retardation film.

The 1/4 wavelength phase difference film can be formed by stretching the plastic film uniaxially, biaxially, or the like, or regularly sequencing a liquid crystal material in the plastic film or a layer provided on the plastic film. As the plastic film, for example, a plastic film made of polycarbonate, polyester, polyvinyl alcohol, polystyrene, polysulfone, polymethyl methacrylate, polypropylene, cellulose acetate-based polymer polyamide, cycloolefin-based polymer, or the like can be used. Among them, from the viewpoint of ease of a manufacturing step in which a 1/4 wavelength phase difference is imparted in the stretching step, it is preferable to stretch the plastic film, and it is particularly preferable to stretch a polycarbonate film, a cycloolefin-based polymer film, or a polyester film. In addition, from the viewpoint of solvent resistance, processing suitability, and thickness reduction, a biaxially-stretched polyester film is most preferred.

The proper 1/4 wavelength phase difference film can be obtained by appropriately adjusting the stretch ratio, the stretching temperature, and the film thickness in ranges that well-known technologies describe. Examples of the proper 1/4 wavelength phase difference film include ARTON manufactured by JSR Corporation, ZEONOR manufactured by Zeon Corporation, PURE-ACE WR manufactured by Teijin Limited, and the like.

The substantially 1/4 wavelength phase difference film can be obtained by the application of the manufacturing of the proper 1/4 wavelength phase difference film. For example, the phase difference at 550 nm is increased by increasing the stretch ratio or increasing the ratio difference between vertical stretching and horizontal stretching, and the phase difference at 550 nm is decreased by decreasing the stretch ratio or decreasing the ratio difference between vertical stretching and horizontal stretching.

In a case in which the 1/4 wavelength phase difference film is used, from the viewpoint of preventing the rainbow interference pattern, the angle formed by the absorption axis of the polarizing film and the optical axis of the 1/4 wavelength phase difference film in the optical laminate is preferably set in a range of 15 degrees to 75 degrees, more preferably set in a range of 20 degrees to 70 degrees, and still more preferably set in a range of 30 degrees to 60 degrees.

The optical axis direction of the 1/4 wavelength phase difference film is a direction of the average orientation angle of the optical axis directions obtained using a molecular orientation analyzer (MOA) manufactured by Oji Scientific instruments.

The above-described optical anisotropic substrate preferably includes an ultraviolet absorbing agent. The ultraviolet absorbing agent is not particularly limited, and organic or inorganic ultraviolet absorbing agents can be used. Among them, an organic ultraviolet absorbing agent having excellent transparency is preferably used. As the ultraviolet absorbing agent, it is possible to use a benzotriazole-based ultraviolet absorbing agent, a benzophenone-based ultraviolet absorbing agent, or the like.

The content of the ultraviolet absorbing agent is approximately in a range of 3 mass % to 15 mass % in the optical anisotropic substrate.

From the viewpoint of stiffness, processing suitability, and thickness reduction, the thickness of the optical anisotropic substrate is preferably in a range of 4 µm to 200 µm, more preferably in a range of 4 µm to 170 µm, still more preferably in a range of 4 µm to 135 µm, and particularly preferably in a range of 4 µm to 100 µm.

In a case in which the optical anisotropic substrate is the high retardation film, the thickness is preferably in a range of 60 µm to 200 µm, more preferably in a range of 60 µm to 170 µm, still more preferably in a range of 60 µm to 135 µm, and particularly preferably in a range of 60 µm to 100 µm.

In addition, in a case in which the optical anisotropic substrate is the 1/4 wavelength phase difference film, the optimal thickness varies whether the 1/4 wavelength phase difference film is the proper 1/4 wavelength phase difference film or the substantially 1/4 wavelength phase difference film. Specifically, the thickness of the proper 1/4 wavelength phase difference film is preferably in a range of 20 µm to 50 µm, and more preferably in a range of 25 µm to 40 µm. The thickness of the substantially 1/4 wavelength phase difference film is preferably in a range of 4 µm to 15 µm, and more preferably in a range of 4 µm to 12 µm.

The 1/4 wavelength phase difference film is preferred since the film thickness can be decreased, but also has a problem with poor handling properties. Therefore, in a case in which the 1/4 wavelength phase difference film is used, a substance obtained by attaching the 1/4 wavelength phase difference film and an optical isotropic film together is preferably used as the optical anisotropic substrate. With the above-described constitution, it is possible to produce the optical anisotropic substrate satisfying the prevention of the rainbow interference pattern, thickness reduction, and handling properties. The above-described effect can be made more significant in a case in which the substantially 1/4 wavelength phase difference film having a thin thickness is used. In addition, the above-described effect can be made most significant in a case in which a biaxially stretched polyester film is used as the substantially 1/4 wavelength phase difference film.

The optical isotropic film has optical isotropy that does not scatter linear polarized light, and an acryl film, a cycloolefin film, a cellulose ester-based film, or the like can be used as the optical isotropic film. Among them, from the viewpoint of adhesiveness and transparency, an acryl film is preferred.

The thickness of the optical isotropic film is preferably in a range of 15 µm to 100 µm, more preferably in a range of 20 µm to 60 µm, and still more preferably in a range of 30 µm to 50 µm.

To attach the 1/4 wavelength phase difference film and the optical isotropic film together, an adhesive layer is formed on any one of both films using a well-known adhesive such as an acryl-based adhesive, a urethane-based adhesive, or a polyester-based adhesive, and the other film is laminated on the adhesive layer. The thickness of the adhesive layer is preferably in a range of 0.1 µm to 20 µm, and more preferably in a range of 1 µm to 10 µm.

In a case in which a substance obtained by attaching the 1/4 wavelength phase difference film and the optical isotropic film together is used as the optical anisotropic substrate, when the conductive layer is formed in contact with the substrate, from the viewpoint of adhesiveness, the conductive layer is preferably formed on the optical isotropic film side.

<Conductive Layer>

The conductive layer plays an alternative role as a touch panel that serves as a conductive member in an external or on-cell liquid crystal display device of the related art. When the conductive layer is located on the operator side of the liquid crystal element, it is possible to prevent the liquid crystal screen from becoming partially cloudy using static electricity generated when the liquid crystal screen is touched.

The conductive layer may be present at an arbitrary location in the optical laminate. Examples of the location of the conductive layer include the surface of the phase difference plate on the polarizing film side, the surface of the phase difference plate on the opposite side to the polarizing film side, the surface of the optical anisotropic substrate on the polarizing film side, the surface of the optical anisotropic substrate on the opposite side to the polarizing film side, and the like. Among them, the location of the conductive layer is optimally on the surface of the phase difference plate on the opposite side to the polarizing film side or the surface of the optical anisotropic substrate on the opposite side to the polarizing film side.

When the conductive layer is located at the optimal location, the conductive layer is located on the outermost surface in a state in which the optical isotropic substrate, the polarizing film, and the phase difference plate are laminated together, and therefore it is possible to facilitate an earthing treatment step for the surface of the conductive layer described below. In addition, the conducive layer is located on the outermost surface in the above-described state; however, when the conductive layer is attached to the in-cell touch panel liquid crystal element or the cover glass, there are no cases in which the conductive layer is exposed, and it is possible to maintain the conductivity for a long period of time.

The conductive layer plays a role of reducing static electricity when the liquid crystal screen is touched, and preventing the liquid crystal screen from becoming cloudy; however, when the conductive layer excessively reduces static electricity, in the case of the electrostatic capacity-type in-cell touch panel, there is a concern that the operation of the touch panel may be hindered. Therefore, the surface resistivity of the conductive layer is preferably in a range of $1.0 \times 10^8 \Omega/\square$ to $2.0 \times 10^9 \Omega/\square$.

The conductive layer is formed of a composition for forming the conductive layer including a conducting agent and a binder resin composition or a diluting solvent which is used as necessary.

Examples of the conducting agent include ion conduction-type conducting agents such as quaternary ammonium salts and lithium salts and electron conduction-type conducting agents such as fine metal particles, fine metal oxide particles, carbon nanotubes, fine coating particles, and polyethylene-dioxythiophene-based particles, and the electron conduction-type conducting agents that are not easily affected by humidity are preferably used. In addition, among the electron conduction-type conducting agents, from the viewpoint of long-term storage, heat resistance, humid and heat resistance, and light resistance, fine metal oxide particles are preferred.

A metal constituting the fine metal particles is not particularly limited, and examples thereof include Au, Ag, Cu, Al, Fe, Ni, Pd, Pt, and the like.

A metal oxide constituting the fine metal oxide particles is not particularly limited, and examples thereof include tin oxide ($SnO_2$), antimony oxide ($Sb_2O_5$), antimony tin oxide (ATO), indium tin oxide (ITO), aluminum zinc oxide (AZO), fluorinated tin oxide (FTO), ZnO, and the like.

The fine coating particles are not particularly limited, and examples thereof include well-known fine particles of the related art having a constitution in which conductive coating layers are formed on the surfaces of fine core particles. The fine core particles are not particularly limited, and examples thereof include inorganic fine particles such as colloidal silica fine particles and silicon oxide fine particles, fine polymer particles such as fluorine resin fine particles, acryl resin particles, and silicone resin particles, and fine particles such as organic or inorganic complex particles. In addition, a material constituting the conductive coating layer is not particularly limited, and examples thereof include the above-described metals, alloys thereof, the above-described metal oxides, and the like.

The average particle diameter of the electron conduction-type conducting agent is preferably in a range of 6 nm to 40 nm. When the average particle diameter is set to 6 nm or more, the electron conduction-type conducting agent particles become more likely to come into contact with each other in the conductive layer, and thus the amount of the conducting agent added to impart sufficient conductivity can be suppressed, and when the average particle diameter is set to 40 nm or less, it is possible to prevent transparency or adhesiveness with other layers from impairing. The more preferable lower limit of the average particle diameter of the electron conduction-type conducting agent is 7 nm, and the more preferable upper limit is 20 nm. The average particle diameter of the electron conduction-type conducting agent is the average value of values obtained by measuring the particle diameters of ten electron conduction-type conducting agent particles through TEM observation.

The electron conduction-type conducting agent preferably has a chain shape or a needle shape. The electron conduction-type conducting agent having the above-described shape is capable of decreasing a change in the surface resistivity of the conductive layer even in a case in which the conductive layer is somewhat deformed (shrunk by curing or extended or contracted due to temperature or humidity).

The content of the electron conduction-type conducting agent in the conductive layer is appropriately adjusted depending on the type, shape, size, and the like of the electron conduction-type conducting agent being used, and, for example, is preferably in a range of 100 parts by mass to 300 parts by mass with respect to 100 parts by mass of a binder resin described below. When the content is set to 100 parts by mass or more, the surface resistivity of the conductive layer can be easily set to $2.0 \times 10^9 \Omega/\square$ or less, and when the content is set to 300 parts by mass or less, the surface resistivity of the conductive layer can be easily set to $1.0 \times 10^8 \Omega/\square$ or more.

Meanwhile, the more preferable lower limit of the content of the electron conduction-type conducting agent is 150 parts by mass, and the more preferable upper limit is 250 parts by mass.

Examples of the binder resin composition include thermoplastic resins, thermosetting resin compositions, and ionizing radiation curable resin compositions, and it is possible to appropriately combine the above-described compositions. The binder resin composition may have adhesiveness, and in a case in which the binder resin composition has adhesiveness, the binder resin composition can be attached to the in-cell touch panel liquid crystal element without forming a separate adhesion layer. The thermoplastic resin in the binder resin composition is preferred since it is possible to make a change in the surface resistivity caused by the deformation (shrinkage by curing or extension or contraction due to temperature and humidity) of the conductive layer difficult to occur, and it is possible to impart temporal stability to the surface resistivity of the conductive layer.

As the thermoplastic resin, it is possible to use thermoplastic resins exemplified in the first conductive layer described below, and as the thermosetting resin compositions and the ionizing radiation curable resin compositions, it is possible to singly use thermosetting resin compositions and ionizing radiation curable resin compositions exemplified as the cured layer of the surface protective film or to use a mixture thereof.

The conductive layer may be constituted of two or more layers. The conductive layer preferably has a bilayer structure since the surface resistivity of the conductive layer easily becomes stable over time. In a case in which the conductive layer has a bilayer structure, it is preferable to use one of the layers as a first conductive layer and the other as a second conductive layer, and constitute the respective layers in the following manner.

As the conducting agent and binder resin for the first conductive layer, it is possible to use the substances described above. The conducting agent for the first conductive layer is preferably the electron conduction-type conducting agent, and, among them, fine metal particles and fine metal oxide particles are more preferred. In addition, the average particle diameter and content of the electron conduction-type conducting agent in the first conductive layer are preferably within the above-described ranges.

As the binder resin for the first conductive layer, a thermoplastic resin is preferred. The use of a thermoplastic resin is preferred since it is possible to make a change in the surface resistivity caused by the deformation (shrinkage by curing or extension or contraction due to temperature and humidity) of the first conductive layer difficult to occur, and it is possible to impart temporal stability to the surface resistivity of the conductive layer.

The thermoplastic resin preferably has no reactive functional group in the molecule. When the thermoplastic resin has a reactive functional group in the molecule, the conductive layer is shrunk by curing due to the reaction of the reactive function group, and there are cases in which the surface resistivity changes. Examples of the reactive group include functional groups having an unsaturated double bond such as an acryloyl group and a vinyl group, cyclic ether groups such as an epoxy ring and an oxetane ring, ring-opening polymerization groups such as a lactone ring, an isocyanate group forming urethane, and the like. These reactive functional groups may be included as long as a change in the surface resistivity caused by the shrinkage of the conductive layer by curing does not occur.

The thermoplastic resin preferably has a side chain. The thermoplastic resin having a side chain can have the excellent temporal stability of the surface resistivity since the side chain serves as a steric hindrance, and thus the thermoplastic resin does not easily move in the conductive layer. The side chain may have an arbitrary structure, but preferably has no reactive functional group described above in the molecule.

The glass transition temperature of the thermoplastic resin is preferably in a range of 80° C. to 120° C. When the glass transition temperature is set to 80° C. or higher, it is possible to prevent the surface resistivity from becoming unstable due to the fact that the thermoplastic resin is flexible, and when the glass transition temperature is set to 120° C. or lower, it is possible to prevent the adhesiveness to other members from degrading due to the thermoplastic resin becoming hard. The more preferable lower limit of the glass transition temperature is 90° C., and the more preferable upper limit is 110° C.

Specifically, as the thermoplastic resin, polymethyl methacrylate is preferably used since polymethyl methacrylate has a characteristic of easily preventing the bleed out of the electron conduction-type conducting agent.

The second conductive layer plays a role of enabling earthing described below by making static electricity generated on the surface of the optical laminate, which reaches the first conductive layer, further flow in the thickness direction.

Therefore, while the first conductive layer has conductivity in the surface direction (X direction and Y direction) and the thickness direction (Z direction), the second conductive layer simply needs to have conductivity in the thickness direction, and the second conductive layer plays a different role from the first conductive layer since the second conductive layer does not necessarily have conductivity in the surface direction.

Figure 6:
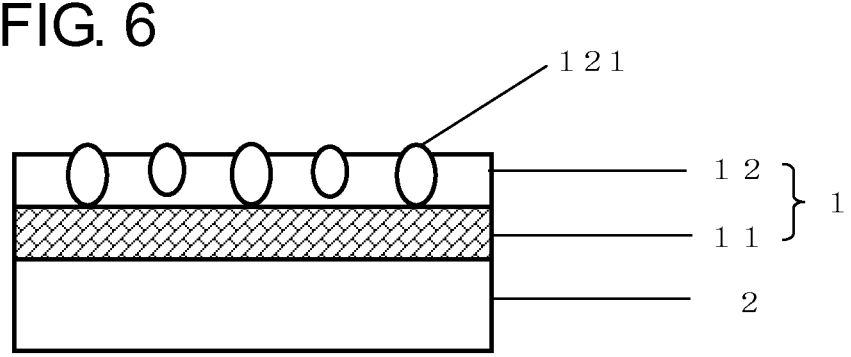
FIG. 6 is a cross-sectional view describing a state in which a first conductive layer and a second conductive layer are electrically connected to each other.

The second conductive layer is preferably constituted so as to include fine conductive particles 121 (FIG. 6). The fine conductive particles play a role of providing a predetermined surface resistivity to the second conductive layer by electrically connecting the surface of the second conductive layer and the first conductive layer. There is no particular limitation regarding the fine conductive particles, and, for example, fine coating particles obtained by forming conductive coating layers on the surfaces of fine core particles are preferably used. As a material constituting the fine coating particles, the same material as the above-described material constituting the fine coating particles for the conductive layer can be used. From the viewpoint of improving the electric connection from the first conductive layer, the fine conductive particles are preferably fine gold plating particles.

The second conductive layer is preferably formed of a second conductive layer-forming composition including the fine conductive particles and a curable resin composition. When the second conductive layer-forming composition includes the curable resin composition, the insufficient hardness of the first conductive layer can be compensated for by the second conductive layer, the durability of the entire conductive layer is improved, and the temporal stability of the surface resistivity can be improved. In addition, the second conductive layer-forming composition more preferably includes a thermoplastic resin.

Examples of the curable resin composition include thermosetting resin composition and ionizing radiation curable resin compositions.

Examples of the thermosetting resin composition include compositions obtained by including a curable resin such as an acryl resin, a urethane resin, a phenol resin, a urea melamine resin, an epoxy resin, a unsaturated polyester resin, and a silicone resin and a curing agent which is added as necessary, compositions obtained by including a monomer constituting the curable resins and a curing agent, and the like.

As the ionizing radiation curable resin composition, it is possible to use a photopolymerizable prepolymer which can be crosslinked and cured by the radiation of an ionizing radiation ray (ultraviolet ray or electron beam), and as the photopolymerizable prepolymer, an acryl-based prepolymer which has two or more acryloyl groups in a molecule and has a three-dimensional network structure when being crosslinked and cured is particularly preferably used.

As the acryl-based prepolymer, it is possible to use urethane acrylate, polyester acrylate, epoxy acrylate, melamine acrylate, polyfluoroalkyl acrylate, silicone acrylate, or the like. These acryl-based prepolymers can be singly used, but are preferably jointly used with a photopolymerizable monomer to further improve the hardness of the cured layer by improving the crosslinking and curing properties.

In a case in which the ionizing radiation curable resin composition is cured by the radiation of a ultraviolet ray, it is preferable to use an additive such as a photopolymerization initiator or a photopolymerization accelerator in addition to the photopolymerizable prepolymer and the photopolymerizable monomer.

In a case in which the second conductive layer includes a thermoplastic resin, from the viewpoint of the adhesiveness to the first conductive layer, the thermoplastic resin is preferably the same as the thermoplastic resin included in the first conductive layer.

Meanwhile, in a case in which a curable resin composition and a thermoplastic resin are jointly used in the second conductive layer, the content of the thermoplastic resin is preferably set in a range of 10 parts by mass to 70 parts by mass, and more preferably set in a range of 20 parts by mass to 60 parts by mass with respect to 100 parts by mass of the curable resin composition.

To obtain a predetermined surface resistivity, the average particle diameter of the fine conductive particles is preferably equal to or greater than the thickness of the second conductive layer. Specifically, the average particle diameter of the fine conductive particles is preferably in a range of 0.4 times to 2.0 times, and more preferably in a range of 0.5 times to 1.6 times with respect to the thickness of the second conductive layer. When the average particle diameter is set to 0.4 times or more, it is possible to improve the electric connection from the first conductive layer, and, when the average particle diameter is set to 2.0 times or less, it is possible to prevent the fine conductive particles from dropping from the second conductive layer.

The content of the fine conductive particles is preferably in a range of 0.5 parts by mass to 2.0 parts by mass with respect to 100 parts by mass of the resin component in the second conductive layer. When the content is set to 0.5 parts by mass or more, it is possible to improve the electric connection from the first conductive layer, and, when the content is set to 2.0 parts by mass or less, it is possible to prevent the coatability and hardness of the second conductive layer from degrading. The more preferable upper limit of the content of the fine conductive particles is 1.5 parts by mass.

As described above, the second conductive layer simply needs to have conductivity in the thickness direction, and does not necessarily have conductivity in the surface direction, and therefore the second conductive layer may have a high intrinsic resistivity. However, to effectively prevent the liquid crystal screen from becoming cloudy and improve the operability of an electrostatic capacity-type touch panel, the surface resistivity measured on the surface of the second conductive layer in a state in which the first conductive layer and the second conductive layer are laminated together is preferably in a range of $1.0 \times 10^8 \Omega/\square$ to $2.0 \times 10^9 \Omega/\square$.

In addition, at this time, the surface resistivity of the first conductive layer is preferably in a range of $1.0 \times 10^8 \Omega/\square$ to $2.0 \times 10^9 \Omega/\square$. When the surface resistivity of the first conductive layer is less than $1.0 \times 10^8 \Omega/\square$, the operability of the electrostatic capacity-type touch panel becomes likely to be adversely affected even when the surface resistivity is $1.0 \times 10^8 \Omega/\square$ or more in a state in which the second conductive layer is laminated. In addition, when the surface resistivity of the first conductive layer exceeds $2.0 \times 10^9 \Omega/\square$, it is not possible to set the surface resistivity to $2.0 \times 10^9 \Omega/\square$ or less in a state in which the second conductive layer is laminated, and it becomes impossible to effectively prevent the liquid crystal screen from becoming cloudy.

The thickness of the conductive layer is preferably in a range of 0.1 μm to 10 μm, and more preferably in a range of 0.5 μm to 8 μm.

In a case in which the conductive layer has a bilayer structure, it is preferable to set the total thickness of the first conductive layer and the second conductive layer within the above-described range, and to provide a thicker thickness to the second conductive layer than the first conductive layer. In addition, the ratio of [the thickness of the second conductive layer]/[the thickness of the first conductive layer] is preferably in a range of 1.5 to 50, more preferably in a range of 5 to 30, and still more preferably in a range of 10 to 20.

The thickness of the conductive layer is a value measured by observing the cross-section using an electronic microscope (for example, SEM, TEM, STEM, or the like).

The conductive layer can be formed by applying, drying, and, if necessary, curing the conductive layer-forming composition made up of a composition constituting the conductive layer, a solvent added as necessary, and the like on the phase difference plate or the surface protective film. The conductive layer may be formed before or after the optical laminate is laminated.

In a case in which the conductive layer is made up of two layers, the conductive layer is preferably formed so that the second conductive layer is present closer to the in-cell touch panel liquid crystal element side than the first conductive layer.

<Earthing Treatment>

On the optical laminate of the present invention, an earthing treatment is preferably carried out starting from the conductive layer surface to effectively prevent the liquid crystal from becoming cloudy.

Meanwhile, the optical laminate of the present invention is attached to the in-cell touch panel liquid crystal element through the adhesion layer, and is incorporated into an in-cell touch panel liquid crystal display device. Therefore, in the optical laminate incorporated into the in-cell touch panel liquid crystal display device, the conductive layer is not exposed on the surface as long as the conductive layer is not formed on the surface protective film, and the earthing treatment becomes extremely difficult. Therefore, the earthing treatment is preferably carried out starting from the conductive layer surface before the optical laminate is incorporated into the in-cell touch panel liquid crystal display device.

Figure 7:
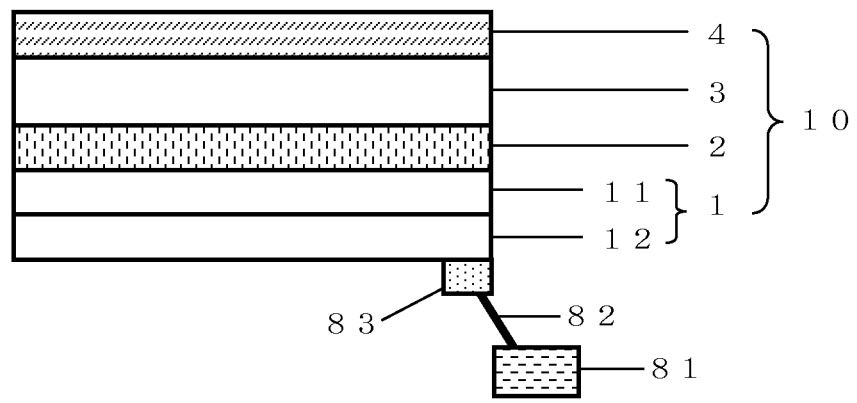
FIG. 7 is a cross-sectional view illustrating still another embodiment of the optical laminate for a front surface of an in-cell touch panel liquid crystal element of the present invention.
Figure 8:
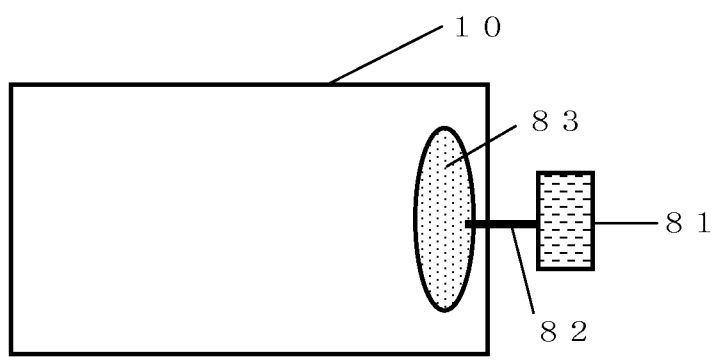
FIG. 8 is a plan view illustrating still another embodiment of the optical laminate for a front surface of an in-cell touch panel liquid crystal element of the present invention.

Examples of the earthing treatment include a method in which the surface of a conductive layer 1 is coupled to another conductive member 81 as illustrated in FIGS. 7 and 8. At this time, the surface of the conductive layer 1 and the conductive member 81 are preferably coupled together through a conductive wire 82. The conductive wire 82 is preferably fixed to the surface of the conductive layer 1 using a conductive adhesive material 83 such as silver paste, carbon tape, or metal tape.

The earthing treatment may be carried out on a single position or multiple positions on the surface of the conductive layer 1. In addition, the conductive member 81 is preferably installed at an outer edge of the conductive layer 1 or at the outside of the optical laminate 10, which is a position outside an effective area (in the case of the in-cell touch panel liquid crystal display device, a position outside a range in which an image is visible) of the optical laminate 10 from the viewpoint of having no influence on optical characteristics.

In a case in which the conductive layer 1 has a bilayer structure of a first conductive layer 11 and a second conductive layer 12 described above, the area of the conductive adhesive material 83 on the second conductive layer 12 is preferably set in a range of 1 mm² to 1 cm². When the area is set to 1 mm² or more, a plurality of the fine conductive particles in the second conductive layer 12 comes into contact with the conductive adhesive material, and it is possible to make the earthing treatment more effective, and when the area is set to 1 cm² or less, it is possible to make an earthed section invisible from the outside.

From the viewpoint of making the earthing treatment more effective, the volume resistivity of the conductive member that is brought into contact with or is adhered to the surface of the conductive layer is preferably $1.0 \times 10^6$ Ωm or less, more preferably $1.0 \times 10^3$ Ωm or less, still more preferably 1.0 Ωm or less, and particularly preferably $1.0 \times 10^{-3}$ Ωm or less.

Examples of the conductive member described above include alloys and the like of silicon, carbon, iron, aluminum, copper, gold, silver, nichrome, and the like.

<The Layer Constitution and Effect of the Optical Laminate>

The optical laminate of the present invention includes the phase difference plate, the polarizing film, and the optical anisotropic substrate, which are described above, in this order, and further includes the conductive layer, the phase difference plate, the polarizing film, and the optical anisotropic substrate are laminated without other layers or only through the conductive layer, and the thickness is in a range of 32 μm to 300 μm. The above-described optical laminate of the present invention is capable of reducing the thickness while necessary functions are ensured, and preventing the liquid crystal screen from becoming cloudy. The thickness of the optical laminate of the present invention is preferably in a range of 33 μm to 250 μm, and more preferably in a range of 33 μm to 200 μm.

The optical laminate of the present invention may include films or layers other than those described above as long as the effects of the present invention are not impaired. For example, the optical laminate may include a functional layer on a surface opposite to the polarizing film of the optical anisotropic substrate. However, the phase difference plate, the polarizing film, and the optical anisotropic substrate need to be laminated without other layers or only through the conductive layer. As described above, the "being laminated without other layers" does not mean that the inclusion of other layers is fully excluded. More specifically, the "being laminated without other layers" does not mean that a constitution in which the phase difference plate, the polarizing film, and the optical anisotropic substrate are laminated through another thin layer having a thickness of less than 0.5 μm (for example, an easy adhesion layer previously provided on the substrate) is excluded.

In addition, as described below, the optical laminate of the present invention may include the adhesive layer to laminate the cover glass and the cover glass on the optical anisotropic substrate, and the above-described thickness is considered to be the thickness of the optical laminate from which the cover glasses and the adhesion layer for laminating the cover glasses are removed.

FIGS. 1 to 3 are cross-sectional views illustrating embodiments of the optical laminate 10 for a front surface of an in-cell touch panel liquid crystal element of the present invention. The optical laminate 10 in FIGS. 1 to 3 includes the phase difference plate 2, the polarizing film 3, and the optical anisotropic substrate 4 in this order, and further includes the conductive layer 1. In FIG. 1, the conductive layer has a bilayer structure of the first conductive layer 11 and the second conductive layer 12.

The optical laminate in FIG. 4 is a cross-sectional view illustrating an example of an optical laminate which can be imagined from the related art.

As illustrated in FIGS. 1 to 3, the optical laminate 10 of the present invention is capable of reducing the thickness since the polarizing film 3 is protected using the phase difference plate 21 or the optical anisotropic substrate 4, and thus a triacetyl cellulose (TAC) film that has been used in the related art to protect the polarizing film and the optical anisotropic substrate installed on the cover glass in the related art to prevent the rainbow interference pattern can be removed.

In addition, the optical laminate 10 of the present invention has equivalent or better functions than the optical laminate of the related art as illustrated in FIG. 4, and the number of members and the interfaces between members can be reduced, and therefore it is possible to improve the entire light transmittance.

In addition, in a preferable embodiment of the optical laminate 10 of the present invention, the phase difference plate 2, the polarizing film 3, the optical anisotropic substrate 4, and the conductive layer 1 are attached (laminated) together without using any adhesion layers. When these components are attached together without using any adhesion layers, it is possible to further reduce the thickness. The polarizing film 3 can be attached to the phase difference plate 2 or the optical anisotropic substrate 4 without using any adhesion layers by using a PVA-based polarizing film as the polarizing film 3, adding water to the PVA-based polarizing film when the polarizing film is attached to the phase difference plate 2 or the optical anisotropic surface protective film 4, and developing adhesiveness in the PVA-based polarizing film. In a case in which the conductive layers are present between the phase difference plate, the polarizing film, the optical anisotropic substrate, it is possible to laminate the components without using any adhesion layers by forming the conductive layer on the phase difference plate or the optical anisotropic substrate in advance, and adding water to the PVA-based polarizing film during lamination in a state in which the conductive layer side of the phase difference plate or the optical anisotropic substrate faces the PVA-based polarizing film side.

As described above, the optical laminate of the present invention is extremely useful since it is possible to satisfy necessary functions corresponding to phase difference, polarization, and polarized sunglasses, reduce the entire thickness, and furthermore to prevent the liquid crystal from becoming cloudy, which is a totally different function from the optical laminate of the related art.

<Cover Glass and Plastic Plate>

The optical laminate of the present invention preferably includes the cover glass or a plastic plate installed on the optical anisotropic substrate, and the installation of the cover glass or the plastic plate is preferred since the stiffness and surface-protecting function of the optical laminate are improved.

A well-known cover glass of the related art can be used as the cover glass, and the thickness is preferably in a range of 0.3 mm to 1.0 mm, and more preferably in a range of 0.3 mm to 0.7 mm. A well-known plastic plate of the related art can be used as the plastic plate, and the thickness is preferably in a range of 0.3 mm to 2.0 mm, and more preferably in a range of 0.3 mm to 1.0 mm.

The cover glass or the plastic plate is preferably installed on the optical anisotropic substrate through an adhesion layer. The adhesion layer can be formed of a composition including an adhesive such as an acryl-based adhesive, a polyester-based adhesive, or a urethane-based adhesive and an additive such as a curing agent used as necessary.

<In-Cell Touch Panel Liquid Crystal Element>

The in-cell touch panel liquid crystal element has a touch panel function such as a resistance film-type touch panel function, an electrostatic capacity-type touch panel function, or an optical touch panel function incorporated into the inside of a liquid crystal element obtained by sandwiching a liquid crystal between two glass substrates. Examples of a liquid crystal display method of the in-cell touch panel liquid crystal element include an IPS method, a VA method, a multi-domain method, an OCB method, a STN method, a TSTN method, and the like.

The in-cell touch panel liquid crystal element is described in, for example, Japanese Unexamined Patent Application Publication Nos. 2011-76602 and 2011-222009.

[In-Cell Touch Panel Liquid Crystal Display Device]

The in-cell touch panel liquid crystal display device of the present invention including an in-cell touch panel liquid crystal element and the optical laminate of the present invention stated above, wherein a surface of the optical laminate, which is present on the opposite side to the transparent substrate on the basis of the polarizing film, attaching onto the in-cell touch panel liquid crystal element.

The in-cell touch panel liquid crystal element and the optical laminate can be attached together through, for example, the adhesion layer.

For the adhesion layer, it is possible to use a urethane-based adhesive, an acryl-based adhesive, a polyester-based adhesive, an epoxy-based adhesive, a vinyl acetate-based adhesive, a vinyl chloride-vinyl acetate copolymer, a cellulose-based adhesive, and other adhesives. The thickness of the adhesion layer is approximately in a range of 10 μm to 25 μm.

The above-described in-cell touch panel liquid crystal display device of the present invention is extremely useful since it is possible to reduce the entire thickness while necessary functions corresponding to polarized sunglasses and the like are satisfied, and furthermore to prevent the liquid crystal from becoming cloudy.

Meanwhile, the earthing treatment is preferably carried out on the in-cell touch panel liquid crystal display device from the conductive layer surface of the optical laminate.

EXAMPLES

Next, the present invention will be described in more detail using examples, but the present invention is not limited by any means to these examples. In the examples, "parts" and "%" are on the basis of mass unless particularly otherwise described.

<Constitution of Adhesion Layers>

An adhesion layer a and an adhesion layer b, which are used in the examples, are as described below.

[Adhesion Layer A]

Adhesive layer A coating solution made up of 100 parts of an acryl-based adhesive (manufactured by Toyo Ink Manufacturing Co., Ltd., OLIVINE BPS1109), 2.5 parts of a curing agent (manufactured by Toyo Ink Manufacturing Co., Ltd., OLIVINE BHS8515), and a diluting solvent

[Adhesive Layer B]

A layer to which the adhesive layer of double-sided adhesive sheet manufactured by Dai Nippon Printing Co., Ltd. (non-carrier FC25K3E46) is transferred.

<In-Cell Touch Panel Liquid Crystal Element>

An electrostatic capacity-type in-cell touch panel liquid crystal element incorporated into a commercially available liquid crystal display device (manufactured by Sony Ericsson Inc., XPERIA P) was prepared.

<Production of a Phase Difference Plate>

The following liquid crystal composition was applied onto a stretched cyclic olefin film manufactured by JSR Corporation (ARTON, film thickness: 28 μm, retardation value: 100 nm) using a die coating method, subsequently, was continuously dried at 60° C. for five minutes in a drying oven, was thermally treated at 90° C. for two minutes in a heat treatment furnace, a liquid crystal layer was oriented, and a film was temporarily coiled. The tension during the transportation of the film at this time was 30 N. Next, as an orientation-fixing treatment, the film was uncoiled, an ultraviolet ray of 300 mJ/cm$^2$ (light intensity measured at 365 nm) was radiated using a high-pressure mercury lamp, and a liquid crystal layer was cured so as to form the liquid crystal layer having a thickness of 1 μm, thereby obtaining a phase difference plate.

(Liquid Crystal Composition)

A side chain-type liquid crystalline polymer expressed by Formula (1) described below was synthesized through radical polymerization. Regarding the molecular weight measured through GPC, the weight-average molecular weight was 9,700 in terms of polystyrene. Meanwhile, the notation in Formula (1) represents the compositional ratios of individual units, and does not mean a block polymer. 10 g of an acrylic compound expressed by Formula (2), 85 g of a side chain-type liquid crystalline polymer expressed by Formula (1), and 5 g of dioxetane compounds expressed by Formula (3) were dissolved in 900 ml of cyclohexanone, 10 g of a triarylsulfonium hexafluoroantimonate 50% propylene carbonate solution (manufactured by Aldrich, reagent) was added in a dark place, and then the solution was filtered using a polytetrafluoroethylene filter having a pore size of 0.45 μm, thereby preparing a solution of the liquid crystal composition.

[Chem. 1]

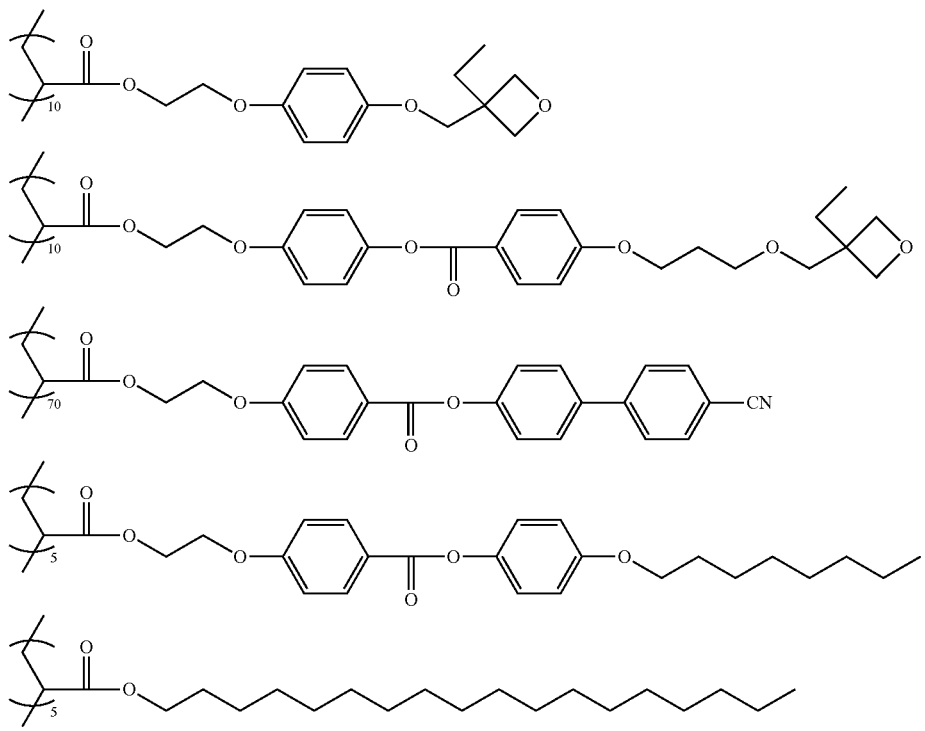

(1)

[Chem. 2]

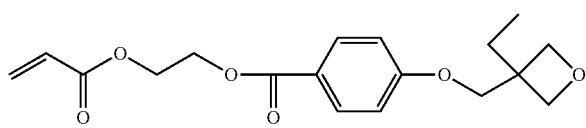

(2)

[Chem. 3]

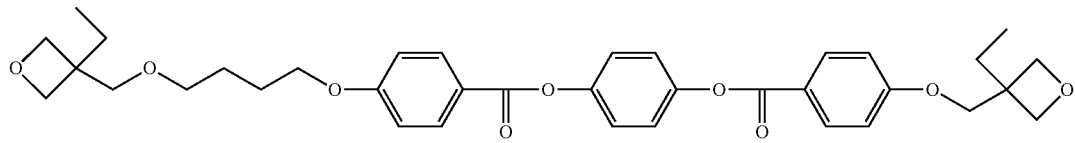

(3)

<Production of a Polarizing Film A>

A PVA aqueous solution having a concentration in a range of 4% to 5% obtained by dissolving PVA powder having a degree of polymerization of 1000 or more and a degree of saponification of 99% or more in water was prepared. Next, the PVA aqueous solution was applied to a 200 μm-thick amorphous PET substrate, and was dried at a temperature in a range of 50° C. to 60° C., thereby forming a 7 μm-thick PVA layer on an amorphous PET substrate (hereinafter, this will be referred to as "laminate including the 7 μm-thick PVA layer").

The laminate including the 7 μm-thick PVA layer was subjected to a two-stage stretching step of auxiliary stretching in the air and stretching in boric acid water, thereby producing a 3 μm-thick polarizing film. The laminate including the 7 μm-thick PVA layer was integrally stretched with the amorphous PET substrate through the first stage of the auxiliary stretching in the air, and a stretched laminate including a 5 μm-thick PVA layer was generated. Hereinafter, this will be referred to as "stretched laminate". Specifically, the stretched laminate was obtained by putting the laminate including the 7 μm-thick PVA layer into a stretching apparatus disposed in an oven which was set in a stretching temperature environment of 130° C., and the free end was uniaxially stretched so that the stretch ratio reached 1.8 times. Due to this stretching treatment, the PVA layer in the stretched laminate turned into a 5 μm-thick PVA layer in which PVA molecules were oriented.

Next, a colored laminate obtained by adsorbing iodine to the 5 μm-thick PVA layer in which PVA molecules were oriented was generated through a dyeing step. Hereinafter, this will be referred to as "colored laminate". Specifically, the colored laminate was obtained by immersing the stretched laminate in a dyeing fluid which had a fluid temperature of 30° C. and included iodine and potassium iodide for an arbitrary time so that the single body transmittance of the PVA layer constituting a polarizing film that was to be finally generated reached 40% to 44%, and thus adsorbing iodine to the PVA layer included in the stretched laminate. In the present step, for the dyeing fluid, water was used as a solvent, the iodine concentration was set in a range of 0.12 mass % to 0.30 mass %, and the potassium iodide concentration was set in a range of 0.7 mass % to 2.1 mass %. The concentration ratio of iodine to potassium iodide is 1 to 7.

Potassium iodide was required so that iodine was dissolved in water. More specifically, when the stretched laminate was immersed in the dyeing fluid having an iodine concentration of 0.30 mass % and a potassium iodide concentration of 2.1 mass % for 60 seconds, the colored laminate obtained by adsorbing iodine to the 5 μm-thick PVA layer in which PVA molecules were oriented was generated. In Example 1, the immersion time of the stretched laminate in the dyeing fluid having an iodine concentration of 0.30 mass % and a potassium iodide concentration of 2.1 mass % was changed, thereby adjusting the amount of iodine adsorbed so that the single body transmittance of the polarizing film that was to be finally generated reached 40% to 44%, and generating a variety of colored laminates having different single body transmittances and degrees of polarization.

Furthermore, the colored laminate was further integrally stretched with the amorphous PET substrate through the second stage of the stretching in the boric acid water, and an optical film laminate including the PVA layer constituting a 3 μm-thick polarizing film was generated. Hereinafter, this will be referred to as "optical film laminate". Specifically, the optical film laminate was obtained by putting the colored laminate into a stretching apparatus disposed in a treatment apparatus which was set in an aqueous solution of boric acid which included boric acid and potassium iodide, and had a temperature in a range of 60° C. to 85° C., and the free end was uniaxially stretched so that the stretch ratio reached 3.3 times. More specifically, the temperature of the aqueous solution of boric acid was 65° C. In addition, the content of boric acid was set to 4 mass % with respect to 100 mass % of water, and the content of potassium iodide was set to 5 mass % with respect to 100 mass % of water.

In the present step, the colored laminate in which the amount of iodine adsorbed had been adjusted was first immersed in the aqueous solution of boric acid for five seconds to ten seconds. Subsequently, the colored laminate was passed through multiple sets of rolls having different circumferential speeds which were a stretching apparatus disposed in the treatment apparatus, and the free end was uniaxially stretched for 30 seconds to 90 seconds so that the stretch ratio reached 3.3 times. Due to this stretching treatment, the PVA layer in the colored laminate turned into a 3 μm-thick PVA layer in which the adsorbed iodine was unidirectionally and highly oriented as a polyiodine ion complex.

This 3 μm-thick PVA layer was peeled off from the PET substrate, and was used as a polarizing film a.

<Production of a Polarizing Film B>

An 80 μm-thick polyvinyl alcohol film was stretched up to three times between rolls having different speed ratios while being dyed in an aqueous solution of iodine having a concentration of 0.3% at 30° C. for one minute. After that, the polyvinyl alcohol film was stretched to a total stretch ratio of six times while being immersed in an aqueous solution including boric acid having a concentration of 4% and potassium iodide having a concentration of 10% at 60° C. for 0.5 minutes. Next, the polyvinyl alcohol film was immersed in an aqueous solution including potassium iodide having a concentration of 1.5% at 30° C. for 10 seconds so as to be washed, and then was dried at 50° C. for four minutes, thereby obtaining a polarizing film b having a thickness of 20 μm.

<Optical Anisotropic Substrate A>

As an optical anisotropic substrate a, a 5.7 μm-thick biaxially-stretched polyester film (manufactured by Toray Industries, Inc., LUMIRROR 5N88, a substantially 1/4 wavelength phase difference film having a phase difference of 134.0 nm at a wavelength of 589.3 nm) was prepared.

<Production of an Optical Anisotropic Substrate B>

A polyethylene terephthalate material was melted at 290° C., was passed through a film-forming die, was extruded in a sheet shape, was adhered to a rotating quenching drum that had been cooled using water, and was cooled, thereby producing an unstretched film. This unstretched film was previously heated in a biaxial stretching testing apparatus (manufactured by Toyo Seki Co., Ltd.) at 120° C. for one minute, then, was stretched to a stretch ratio of 4.5 times at 120° C., and then was stretched in a direction of 90 degrees with respect to the stretching direction at a stretch ratio of 1.5 times, thereby obtaining a high retardation film (optical anisotropic substrate b) having nx=1.70, ny=1.60, a film thickness of 80 μm, and a retardation value at a wavelength of 550 nm of 8000 nm.

<Production of an Optical Anisotropic Substrate C>

A polyethylene terephthalate material was melted at 290° C., was passed through a film-forming die, was extruded in a sheet shape, was adhered to a rotating quenching drum that had been cooled using water, and was cooled, thereby producing an unstretched film. This unstretched film was previously heated in a biaxial stretching testing apparatus (manufactured by Toyo Seki Co., Ltd.) at 120° C. for one minute, then, was stretched to a stretch ratio of 4.5 times at 120° C., and then was stretched in a direction of 90 degrees with respect to the stretching direction at a stretch ratio of 1.5 times, thereby obtaining a high retardation film (optical anisotropic substrate c) having a film thickness of 100 μm, Δn=0.099, and a retardation value of 9900 nm.

<Measurement and Evaluation of Properties of Optical Laminates>

The properties of the optical laminates of Examples and Comparative Examples were measured and evaluated in the following manner. The results are described in Tables 1-1 and 1-2.

[Surface Resistivity]

The surface resistivity (Ω/□) of the conductive layer immediately after the manufacturing of the optical laminate was measured on the basis of JIS K6911. The surface resistivity (Ω/□) was measured using a high resistivity meter HIGH LEICESTER UP MCP-HT450 (manufactured by Mitsubishi Chemical Corporation), URS probe MCP-HTP14 (manufactured by Mitsubishi Chemical Corporation) as a probe, in an environment of a temperature of 25±4° C. and a humidity of 50±10% at an applied voltage of 500 V.

In a case in which the conductive layer had a bilayer structure, the surface resistivity on the second conductive layer was measured.

[Temporal Stability of Surface Resistivity]

The surface resistivity (Ω/□) of the conductive layer after the optical laminate had been held at 80° C. for 100 hours was measured, and a ratio of (the surface resistivity after holding the optical laminate at 80° C. for 100 hours)/(the surface resistivity immediately after the manufacturing) was calculated. In addition, the surface of the conductive layer in the optical laminate was reciprocally rubbed ten times (stroke 100 mm) using steel wool (No. 0000) by applying a load of 100 g, and whether or not rubbing scratches were visually observed on the surface of the conductive layer was checked. As a result, a conductive layer in which the ratio was in a range of 0.5 to less than 3, and rubbing scratches were not observed was evaluated as "A", and a conductive layer in which the ratio was in a range of 0.5 to less than 3, and rubbing scratches were observed was evaluated as "B".

[Rainbow Interference Pattern]

The optical laminate of each of Examples and Comparative Examples was attached onto the in-cell touch panel liquid crystal element through adhesion layer (b) having a thickness of 20 μm, the screen was made to display white or substantially white, and whether or not the rainbow interference pattern (rainbow shape) could be visually observed at a variety of angles beyond commercially available polarized sunglasses or beyond a polarization plate was evaluated.

A: The rainbow shape could not be observed.

C: The rainbow shape was observed.

[Liquid Crystal Screen Becoming Cloudy]

After the optical laminate of each of Examples and Comparative Examples was attached onto the in-cell touch panel liquid crystal element through adhesion layer (b) having a thickness of 20 μm, a conductive wire fixed to the conductive layer in the optical laminate was connected to a conductive member. Next, a protective film (a well-known protective film such as a polyethylene protective film or a PET protective film) was further attached onto the outermost surface of the optical laminate. Next, the attached protective film was removed, the liquid crystal display device was immediately driven, and whether or not the liquid crystal display device became cloudy when being touched by a finger was visually evaluated.

A: The liquid crystal screen becoming cloudy could not be observed.

B: There were cases in which the liquid crystal screen becoming slightly cloudy was observed, which was extremely microscopic.

C: The liquid crystal screen becoming cloudy was clearly observed.

[Operability]

The optical laminate of each of Examples and Comparative Examples was attached onto the in-cell touch panel liquid crystal element through adhesion layer (b) having a thickness of 20 μm. Next, whether or not a liquid crystal•touch sensor was operated without any failure when the outermost surface of the optical laminate was touched by hand was visually evaluated.

A: The liquid crystal•touch sensor was operated without any problems.

B: The liquid crystal•touch sensor was operated while poor operation was slightly observed.

C: The liquid crystal•touch sensor was not operated.

[Entire Light Transmittance]

The entire light transmittance was measured using a haze meter according to JIS K7136, and, on the basis of the optical laminate of Example 5, an optical laminate having a higher entire light transmittance was evaluated as "A", and an optical laminate having a lower entire light transmittance was evaluated as "C".

Example 1

(1) Formation of a Conductive Layer

HRAG acrylic (25) MIBK (thermoplastic resin, weight-average molecular weight of 70,000, glass transition temperature of 100° C.) manufactured by DNP Fine Chemical Co., Ltd. was dissolved in propylene glycol monomethyl ether, furthermore, V3560 (ATO dispersion fluid, ATO average particle diameter of 8 nm) manufactured by JGC C&C was added and stirred, and adjustment was carried out so that the final solid content reached 8%, and the ratio of the thermoplastic resin to ATO reached 100:200 (mass ratio), thereby obtaining a composition for a conductive layer.

The composition for a conductive layer was applied and dried onto a liquid crystal layer of the phase difference plate produced above through slit reverse coating so that the dried coating thickness reached 0.3 μm, thereby forming a conductive layer.

(2) Production of an Optical Laminate

The conductive layer-attached phase difference plate, the polarizing film a, and the optical anisotropic substrate a, which were produced above, were used. While water was blown to the polarizing film a, the conductive layer-attached phase difference plate was attached to one surface of the polarizing film a, and the optical anisotropic substrate a was attached to the other surface, thereby obtaining an optical laminate. During the attachment, the phase difference plate side of the conductive layer-attached phase difference plate was made to face the polarizing film side. Furthermore, a cover glass (cover glass manufactured by Corning Incorporated, 0.5 mm) was attached to the surface of the optical anisotropic substrate opposite to the polarizing film a through a 5 μm-thick adhesion layer (a).

In addition, a conductive wire was fixed to one position in the outer edge section of the surface of the conductive layer in the obtained optical laminate using silver paste, furthermore, the conducive wire was connected to a conductive member (nichrome, volume resistance value of $1.5 \times 10^{-6}$ Ωm), and the earthing treatment was carried out. The area of the fixing position was set to 2 $mm^2$.

Example 2

An optical laminate was produced in the same manner as in Example 1 except for the fact that the second conductive layer was formed on the conductive layer (the first conductive layer) of Example 1 using the following method.

(Formation of the Second Conductive Layer)

Pentaerythritol triacrylate (PETA), HRAG acrylic (25) MIBK (thermoplastic resin) manufactured by DNP Fine Chemicals Co., Ltd. were added to a mixed solvent of methyl ethyl ketone (MEK)/isopropanol (IPA) so that the solid contents of the two components sequentially reached 70 parts and 30 parts, and were stirred and dissolved, thereby obtaining a solution e.

Next, with respect to 100 parts of the solid content of the solution e, 4 parts by mass of a photopolymerization initiator (manufactured by BASF Japan, IRGACURE 184) and 0.2 parts of a leveling agent (manufactured by Dainichiseika Color & Chemicals Mfg. Co., Ltd., 10-301 (TL)) were added and stirred, thereby preparing a solution f.

Next, 0.83 parts of a fine conductive particle dispersion fluid (manufactured by DNP Fine Chemicals Co., Ltd., bright dispersion fluid, average particle diameter of the fine conductive particles of 4.6 μm, solid content of 25%) was added to 100 parts of the resin component in the solution f and stirred, and finally, an ultraviolet absorbing agent (manufactured by BASF Japan, TINUVI 477) was added and stirred so that the content thereof reached 6 parts with respect to 100 parts of the solid content of the solution f, thereby obtaining a composition for the second conductive layer having a total solid content of 25%.

The composition for the second conductive layer was applied onto the previously-formed conductive layer (first conductive layer) through slit reverse coating so that the dried coating amount reached 6 $g/m^2$, thereby forming a coated film. After the obtained coated film was dried at 70° C. for one minute, the coated film was cured by radiating an ultraviolet ray at an ultraviolet radiation level of 80 $mJ/cm^2$, and a 5 μm-thick second conductive layer was formed, thereby obtaining an optical laminate.

Example 3

An optical laminate was produced in the same manner as in Example 1 except for the fact that, in Example 1, the conductive layer (the first conductive layer) was formed not on the phase difference plate but on the optical anisotropic substrate a, and the conductive layer side of the optical anisotropic substrate a and the polarizing film were attached together. Meanwhile, in Example 3, the same earthing treatment as in Example 1 was carried out before the optical anisotropic substrate a and the phase difference plate were attached together.

Example 4

An optical laminate was produced in the same manner as in Example 1 except for the fact that the optical anisotropic substrate a in Example 1 was changed to the optical anisotropic substrate b (a thickness of 80 μm and a retardation value at a wavelength of 589.3 nm of 8000 nm).

Example 5

An optical laminate was produced in the same manner as in Example 1 except for the fact that the optical anisotropic substrate a in Example 1 was changed to the optical anisotropic substrate c (a thickness of 100 μm and a retardation value at a wavelength of 589.3 nm of 9900 nm), the second conductive layer was provided on the first conductive layer, and the polarizing film a was changed to the polarizing film b.

Example 6

An optical laminate was produced in the same manner as in Example 2 except for the fact that the dried coating thickness of the first conductive layer in Example 2 was changed to 1.0 μm, and the dried coating amount and thickness of the second conductive layer were changed to 4 $g/m^2$ and 3 μm.

Example 7

An optical laminate was produced in the same manner as in Example 1 except for the fact that, in Example 1, the ratio of the thermoplastic resin to ATO in the composition for the conductive layer was changed to 100:400, and the dried coating thickness was changed to 1 μm.

Example 8

An optical laminate was produced in the same manner as in Example 2 except for the fact that the dried coating amount and thickness of the second conductive layer in Example 2 were changed to 10 $g/m^2$ and 9 μm.

Example 9

An optical laminate was produced in the same manner as in Example 2 except for the fact that the dried coating amount and thickness of the second conductive layer in Example 2 were changed to 13 $g/m^2$ and 12 μm.

Example 10

The same conductive layer (first conductive layer) as in Example 1 was formed on the surface of the following optical anisotropic substrate x on the acryl film side, thereby obtaining a conductive layer (first conductive layer)-attached optical anisotropic substrate.

Next, the phase difference plate, the polarizing film a, and the conductive layer-attached optical anisotropic substrate x were attached together in the following manner. While water was blown to the polarizing film a, the phase difference plate was attached to one surface of the polarizing film a, and the conductive layer-attached optical anisotropic substrate x was attached to the other surface, thereby obtaining an optical laminate. During the attachment, the polyester film side of the conductive layer-attached optical anisotropic substrate x was made to face the polarizing film side.

Next, the same earthing treatment as in Example 1 was carried out on the surface of the conductive layer.

Next, a cover glass (Gorilla glass manufactured by Corning Incorporated, 0.5 mm) was attached to the surface of the conductive layer through the 5 μm-thick adhesion layer (a).

<Optical Anisotropic Substrate X>

An optical anisotropic substrate obtained by forming the adhesion layer a on a 5.7 μm-thick biaxially-stretched polyester film (manufactured by Toray Industries, Inc., LUMIRROR 5N88, a substantially 1/4 wavelength phase difference film having a phase difference of 134.0 nm at a wavelength of 589.3 nm) so that the thickness reached 5 μm, and then attaching a 40 μm-thick acryl film (manufactured by Mitsubishi Rayon Co., Ltd., HBS010P).

Example 11

An optical laminate was obtained in the same manner as in Example 10 except for the fact that the same second conductive layer as in Example 2 was formed on the first conductive layer.

Comparative Example 1

An optical laminate was produced in the same manner as in Example 2 except for the fact that the optical anisotropic substrate a in Example 2 was changed to a substance obtained by attaching a triacetyl cellulose film (manufactured by Konica Minolta, KC4UA, 40 μm), a cycloolefin films (manufactured by JRS Corporation, ARTON, retardation value of 100 nm, film thickness of 28 microns), and a cover glass (Gorilla glass manufactured by Corning, 0.5 mm) through the 5 μm-thick adhesion layer (a).

Comparative Example 2

The phase difference plate produced above was attached to one surface of the polarizing film a using water paste, and a triacetyl cellulose film (manufactured by Konica Minolta, KC4UA, 40 μm) was attached to the other surface respectively, thereby obtaining a polarizing film sandwiched by the phase difference plate and the triacetyl cellulose film.

Next, the same conductive layer as in Example 1 was formed on the optical anisotropic substrate a, thereby obtaining a conductive layer-attached optical anisotropic substrate. Next, the surface of the above-produced polarizing film on the triacetyl cellulose film side was attached to one surface of the cover glass (Gorilla glass manufactured by Corning, 0.5 mm) through the 5 μm-thick adhesion layer (a), and furthermore, the surface of the conductive layer-attached optical anisotropic substrate on the substrate side was attached to the other surface of the cover glass through the 5 μm-thick adhesion layer (a), thereby producing an optical laminate.

Comparative Example 3

An optical laminate was produced in the same manner as in Comparative Example 2 except for the fact that the second conductive layer in Example 2 was formed on the conductive layer (first conductive layer) of the optical laminate in Comparative Example 2.

Comparative Example 4

An optical laminate was produced in the same manner as in Example 1 except for the fact that the conductive layer was not formed.

Comparative Example 5

An optical laminate was produced in the same manner as in Example 1 except for the fact that the optical anisotropic substrate a in Example 1 was changed to a 23 μm-thick non-optical anisotropic polyester film (manufactured by Mitsubish Plastics, Inc., T600E25N).

Comparative Example 6

An optical laminate was produced in the same manner as in Example 1 except for the fact that the optical anisotropic substrate a in Example 1 was changed to a 100 μm-thick non-optical anisotropic polyester film (manufactured by Toyobo Co., Ltd., COSMO SHINE A4300).

TABLE 1-1

Table 1-1

| | Example 1 | Example 2 | Example 3 | Example 4 | Example 5 | Example 6 | Example 7 | Example 8 | Example 9 |
|---|---|---|---|---|---|---|---|---|---|
| Layer constitution (thicknesses of individual layers) | — | — | — | — | — | — | — | — | — |
| | — | — | — | — | — | — | — | — | — |
| | — | Cover glass (500 μm) | — | — | Cover glass (500 μm) | Cover glass (500 μm) | — | Cover glass (500 μm) | Cover glass (500 μm) |
| | Cover glass (500 μm) | Adhesion layer (5 μm) | Cover glass (500 μm) | Cover glass (500 μm) | Adhesion layer (5 μm) | Adhesion layer (5 μm) | Cover glass (500 μm) | Adhesion layer (5 μm) | Adhesion layer (5 μm) |
| | Adhesion layer (5 μm) | Optical anisotropic substrate (5.7 μm) | Adhesion layer (5 μm) | Adhesion layer (5 μm) | Optical anisotropic substrate (100 μm) | Optical anisotropic substrate (5.7 μm) | Adhesion layer (5 μm) | Optical anisotropic substrate (5.7 μm) | Optical anisotropic substrate (5.7 μm) |
| | Optical anisotropic substrate (5.7 μm) | Polarizing film (5 μm) | Optical anisotropic substrate (5.7 μm) | Optical anisotropic substrate (80 μm) | Polarizing film (20 μm) | Polarizing film (5 μm) | Optical anisotropic substrate (5.7 μm) | Polarizing film (5 μm) | Polarizing film (5 μm) |

TABLE 1-1-continued

| | | | | | | | | |
|---|---|---|---|---|---|---|---|---|
| Polarizing film (5 μm) | Phase difference plate (28 μm) | Conductive layer (0.3 μm) | Polarizing film (5 μm) | Phase difference plate (28 μm) | Phase difference plate (28 μm) | Polarizing film (5 μm) | Phase difference plate (28 μm) | Phase difference plate (28 μm) |
| Phase difference plate (28 μm) | Phase difference plate (1 μm) | Polarizing film (5 μm) | Phase difference plate (28 μm) | Phase difference plate (1 μm) | Phase difference plate (1 μm) | Phase difference plate (28 μm) | Phase difference plate (1 μm) | Phase difference plate (1 μm) |
| Phase difference plate (1 μm) | First conductive layer (0.3 μm) | Phase difference plate (28 μm) | Phase difference plate (1 μm) | First conductive layer (0.3 μm) | First conductive layer (1.0 μm) | Phase difference plate (1 μm) | First conductive layer (0.3 μm) | First conductive layer (0.3 μm) |
| Conductive layer (0.3 μm) | Second conductive layer (5.0 μm) | Phase difference plate (1 μm) | Conductive layer (0.3 μm) | Second conductive layer (5.0 μm) | Second conductive layer (3.0 μm) | Conductive layer (1.0 μm) | Second conductive layer (9.0 μm) | Second conductive layer (12.0 μm) |

| | | | | | | | | | |
|---|---|---|---|---|---|---|---|---|---|
| Thickness of optical laminate (μm) | 40 | 45 | 40 | 114.3 | 154.3 | 43.7 | 40.7 | 49 | 52 |
| Surface resistivity (Ω/□) | 3.0E+08 | 3.0E+08 | 3.0E+08 | 3.0E+08 | 3.0E+08 | 1.0E+08 | 1.0E+08 | 2.0E+09 | 1.0E+10 |
| Temporal stability | B | A | B | B | A | A | B | A | A |
| Rainbow interference pattern | A | A | A | A | A | A | A | A | A |
| Liquid crystal becoming cloudy | A | A | A | A | A | A | A | A | A |
| Operability | A | A | A | A | A | A | B | A | A |
| Entire light transmittance | A | A | A | A | — | A | A | A | A |

Table 1-2

| | Example 10 | Example 11 | Comparative Example 1 | Comparative Example 2 | Comparative Example 3 | Comparative Example 4 | Comparative Example 5 | Comparative Example 6 |
|---|---|---|---|---|---|---|---|---|
| Layer constitution (thicknesses of individual layers) | — | — | Cover glass (500 μm) | — | Second conductive layer (5 μm) | — | — | — |
| | — | — | Adhesion layer (5 μm) | Conductive layer (0.3 μm) | First conductive layer (0.3 μm) | — | — | — |
| | — | Cover glass (500 μm) | Optical anisotropic substrate (28 μm) | Optical anisotropic substrate (28 μm) | Optical anisotropic substrate (28 μm) | — | — | — |
| | Cover glass (500 μm) | Adhesion layer (5 μm) | Adhesion layer (5 μm) | Adhesion layer (5 μm) | Adhesion layer (5 μm) | — | Cover glass (500 μm) | Cover glass (500 μm) |
| | Adhesion layer (5 μm) | Second conductive layer (5.0 μm) | TAC (40 μm) | Cover glass (500 μm) | Cover glass (500 μm) | Cover glass (500 μm) | Adhesion layer (5 μm) | Adhesion layer (5 μm) |
| | Conductive layer (0.3 μm) | First conductive layer (0.3 μm) | Polarizing film (5 μm) | Adhesion layer (5 μm) | Adhesion layer (5 μm) | Adhesion layer (5 μm) | Substrate (23 μm) | Substrate (100 μm) |
| | Optical anisotropic substrate (50.7 μm) | Optical anisotropic substrate (50.7 μm) | Phase difference plate (28 μm) | TAC (40 μm) | TAC (40 μm) | Optical anisotropic substrate (5.7 μm) | Polarizing film (5 μm) | Polarizing film (5 μm) |
| | Polarizing film (5 μm) | Polarizing film (5 μm) | Phase difference plate (1 μm) | Polarizing film (5 μm) | Polarizing film (5 μm) | Polarizing film (5 μm) | Phase difference plate (28 μm) | Phase difference plate (28 μm) |
| | Phase difference plate (28 μm) | Phase difference plate (28 μm) | First conductive layer (0.3 μm) | Phase difference plate (28 μm) | Phase difference plate (28 μm) | Phase difference plate (28 μm) | Phase difference plate (1 μm) | Phase difference plate (1 μm) |
| | Phase difference plate (1 μm) | Phase difference plate (1 μm) | Second conductive layer (5.0 μm) | Phase difference plate (1 μm) | Phase difference plate (1 μm) | Phase difference plate (1 μm) | Conductive layer (0.3 μm) | Conductive layer (0.3 μm) |
| Thickness of optical laminate (μm) | 85 | 90 | 112.3 | 107.3 | 112.3 | 39.7 | 57.3 | 134.3 |
| Surface resistivity (Ω/□) | 3.0E+08 | 3.0E+08 | 3.0E+08 | 3.0E+08 | 3.0E+08 | Not measurable | 3.0E+08 | 3.0E+08 |

TABLE 1-1-continued

| | | | | | | | | |
|---|---|---|---|---|---|---|---|---|
| Temporal stability | B | A | A | B | A | — | B | B |
| Rainbow interference pattern | A | A | A | A | A | A | C | C |
| Liquid crystal becoming cloudy | A | A | A | A | A | C | A | A |
| Operability | A | A | A | A | A | A | A | A |
| Entire light transmittance | A | A | C | C | C | A | A | A |

\* In tables 1-1 and 1-2, "The thickness of the optical laminate" refers to a value obtained by subtracting the thicknesses of the cover glass and the adhesion layer for adhering the cover glass from the total value of the thicknesses of the respective layers.
\* The optical anisotropic substrates in Examples 10 and 11 . . . 5.7 μm PET/adhesion layer (5 μm)/40 μm acryl As is clear from Table 1, in spite of the thin thickness of 200 μm or less, the optical laminates of Examples 1 to 11 were all capable of preventing the rainbow interference pattern and the liquid crystal from becoming cloudy, and were excellent in terms of the temporal stability of the surface resistivity and the operability and entire light transmittance of the in-cell touch panel.

REFERENCE SIGNS LIST

1 Conductive layer
11 First conductive layer
12 Second conductive layer
121 Fine conductive particle
2 Phase difference plate
21 Resin film
22 Refractive index anisotropic material-containing layer
3 Polarizing film
4 Optical anisotropic substrate
5 Adhesion layer
6 Polarizing film protective film
7 Cover glass
81 Conductive member
82 Conductive wire
83 Conductive adhesive material
10 Optical laminate of the present invention
10a Optical laminate
20 In-cell touch panel liquid crystal element
30 In-cell touch panel liquid crystal display device

The invention claimed is:

1. An optical laminate for a front surface of an in-cell touch panel liquid crystal element, comprising:
   a phase difference plate;
   a polarizing film;
   a transparent substrate in this order; and
   a conductive layer,
   wherein the transparent substrate has optical anisotropy that scatters linear polarized light emitted from the polarizing film, the phase difference plate, the polarizing film, and the transparent substrate are laminated without other layers or only through the conductive layer, and a thickness of the optical laminate is in a range of 32 μm to 300 μm,
   wherein the conductive layer has a bilayer structure of a first conductive layer and a second conductive layer, and
   wherein the first conductive layer comprises a thermoplastic resin.

2. The optical laminate for a front surface of an in-cell touch panel liquid crystal element according to claim 1, further comprising:
   a cover glass on the transparent substrate of the optical laminate.

3. The optical laminate for a front surface of an in-cell touch panel liquid crystal element according to claim 1,
   wherein the transparent substrate is a plastic film having a retardation value in a range of 3000 nm to 30000 nm or a plastic film having a 1/4 wavelength phase difference.

4. The optical laminate for a front surface of an in-cell touch panel liquid crystal element according to claim 1,
   wherein the transparent substrate comprises a plastic film having a 1/4 wavelength phase difference attached to an optical isotropic film.

5. The optical laminate for a front surface of an in-cell touch panel liquid crystal element according to claim 4,
   wherein the plastic film having a 1/4 wavelength phase difference is a biaxially stretched polyester film having a thickness in a range of 4 μm to 15 μm.

6. The optical laminate for a front surface of an in-cell touch panel liquid crystal element according to claim 1,
   wherein a surface resistivity of the conductive layer is in a range of $1.0 \times 10^8$ Ω/□ to $2.0 \times 10^9$ Ω/□.

7. The optical laminate for a front surface of an in-cell touch panel liquid crystal element according to claim 1,
   wherein the first conductive layer comprises fine metal particles or fine metal oxide particles, and the second conductive layer comprises fine conductive particles comprising conductive coating layers on surfaces of fine core particles.

8. The optical laminate for a front surface of an in-cell touch panel liquid crystal element according to claim 1,
   wherein the optical laminate comprises the conductive layer on a surface of the phase difference plate opposite to the polarizing film or on a surface of the transparent substrate opposite to the polarizing film.

9. The optical laminate for a front surface of an in-cell touch panel liquid crystal element according to claim 1,
   wherein a conductive member for connection is fixed on a surface of the conductive layer.

10. The optical laminate for a front surface of an in-cell touch panel liquid crystal element according to claim 1,
    wherein the phase difference plate, the polarizing film, the transparent substrate, and the conductive layer are attached together without using an adhesion layer.

11. The optical laminate for a front surface of an in-cell touch panel liquid crystal element according to claim 1,
    wherein a thickness of the phase difference plate is in a range of 25 μm to 60 μm, a thickness of the polarizing film is in a range of 2 μm to 30 μm, a thickness of the transparent substrate is in a range of 4 μm to 200 μm, and a thickness of the conductive layer is in a range of 0.1 μm to 10 μm.

12. The optical laminate for a front surface of an in-cell touch panel liquid crystal element according to claim 1, wherein the in-cell touch panel liquid crystal element is an electrostatic capacity-type in-cell touch panel liquid crystal element.

13. An in-cell touch panel liquid crystal display device, comprising:
an in-cell touch panel liquid crystal element; and
an optical laminate for a front surface of the in-cell touch panel liquid crystal element, comprising:
a phase difference plate;
a polarizing film;
a transparent substrate in this order; and
a conductive layer,
wherein the transparent substrate has optical anisotropy that scatters linear polarized light emitted from the polarizing film, the phase difference plate, the polarizing film, and the transparent substrate are laminated without other layers or only through the conductive layer, and a thickness of the optical laminate is in a range of 32 μm to 300 μm,
wherein the conductive layer is located on a surface of the phase difference plate on a polarizing film side, a surface of the phase difference plate on an opposite side to the polarizing film side, or a surface of the transparent substrate on a polarizing film side,
wherein the conductive layer has a bilayer structure of a first conductive layer and a second conductive layer, and
wherein a surface of the optical laminate, which is opposite the transparent substrate relative to the polarizing film, is attached to the in-cell touch panel liquid crystal element.

14. The in-cell touch panel liquid crystal display device according to claim 13,
wherein the conductive layer in the optical laminate is connected to another conductive member.

15. The optical laminate for a front surface of an in-cell touch panel liquid crystal element according to claim 1,
wherein a molecule of the thermoplastic resin does not include a reactive functional group.

16. The optical laminate for a front surface of an in-cell touch panel liquid crystal element according to claim 1,
wherein the second conductive layer comprises a thermoplastic resin.

17. The in-cell touch panel liquid crystal display device according to claim 13,
wherein the first conductive layer comprises a thermoplastic resin.

18. The in-cell touch panel liquid crystal display device according to claim 17,
wherein a molecule of the thermoplastic resin does not include a reactive functional group.

19. The in-cell touch panel liquid crystal display device according to claim 13,
wherein the second conductive layer comprises a thermoplastic resin.

20. The in-cell touch panel liquid crystal display device according to claim 13,
wherein the first conductive layer comprises fine metal particles or fine metal oxide particles, the second conductive layer comprises fine coating particles comprising conductive coating layers on surfaces of fine core particles.

* * * * *